US009082226B2

(12) United States Patent
Madden et al.

(10) Patent No.: US 9,082,226 B2
(45) Date of Patent: Jul. 14, 2015

(54) GRAPH DRAWING USING PRECISE SHAPE CLIPPING

(71) Applicant: Tom Sawyer Software, Berkeley, CA (US)

(72) Inventors: Brendan Madden, Berekely, CA (US); Krists Boitmanis, Riga (LV)

(73) Assignee: Tom Sawyer Software, Berkeley, CA (US)

( * ) Notice: Subject to any disclaimer, the term of this patent is extended or adjusted under 35 U.S.C. 154(b) by 164 days.

(21) Appl. No.: 13/852,354

(22) Filed: Mar. 28, 2013

(65) Prior Publication Data

US 2014/0292763 A1    Oct. 2, 2014

(51) Int. Cl.
*G06T 11/20*    (2006.01)

(52) U.S. Cl.
CPC ............. *G06T 11/206* (2013.01); *G06T 11/203* (2013.01); *G06T 2207/20144* (2013.01)

(58) Field of Classification Search
None
See application file for complete search history.

(56) References Cited

U.S. PATENT DOCUMENTS

| 8,041,082 | B1 * | 10/2011 | Baluja et al. | 382/118 |
|---|---|---|---|---|
| 2009/0060334 | A1 * | 3/2009 | Rayner | 382/173 |
| 2012/0093411 | A1 * | 4/2012 | Tang et al. | 382/173 |
| 2012/0266081 | A1 * | 10/2012 | Kao | 715/751 |
| 2013/0278788 | A1 * | 10/2013 | Levy | 348/222.1 |
| 2014/0074888 | A1 * | 3/2014 | Potter et al. | 707/779 |
| 2014/0168205 | A1 * | 6/2014 | Naveh et al. | 345/419 |
| 2014/0189530 | A1 * | 7/2014 | Anand et al. | 715/753 |

OTHER PUBLICATIONS

C. Küçükkeçeci, Chisio: A visual framework for compound graph editing and layout, Master's thesis, Bilkent University, Jun. 2007.*
M. Belviranli, A circular layout algorithm for clustered graphs, PhD dissertation, Bilkent University, Aug. 2009.*

* cited by examiner

*Primary Examiner* — Maurice L McDowell, Jr.
*Assistant Examiner* — Donna J Ricks
(74) *Attorney, Agent, or Firm* — Useful Arts IP

(57) ABSTRACT

A computer-implemented method is provided for drawing a graph in which multiple nodes are connected by multiple edges. An image is displayed representing a node, and the image is processed to distinguish image foreground pixels and image background pixel. An edge is displayed incident to the node, the edge extending over selected background pixels and stopping short of selected foreground pixels. There results a graph drawing that is more aesthetically pleasing.

18 Claims, 11 Drawing Sheets

GRAPH DRAWING USING PRECISE SHAPE CLIPPING

FIELD OF THE INVENTION

The present invention generally relates to graph drawing and data visualization.

BACKGROUND OF THE INVENTION

In graphically rich presentations of relational data, nodes may be represented as combinations of images, text elements, shapes, and other graphical elements. When drawing lines between such nodes, a drawing system needs to determine the clipping points, i.e., where to terminate the lines at their end nodes. A straightforward approach terminates the lines at the bounding rectangles of the respective nodes, leaving a visual gap between the line and its end node. An example of a drawing using such an approach is shown in FIG. 3.

BRIEF DESCRIPTION OF THE DRAWING FIGURES

DETAILED DESCRIPTION

Summary

In one aspect, a computer-implemented method is provided for drawing a graph in which multiple nodes are connected by multiple edges. An image is displayed representing a node, and the image is processed to distinguish image foreground pixels and image background pixels. An edge is displayed incident to the node, the edge extending over selected background pixels and stopping short of selected foreground pixels. The image may include multiple graphical elements, in which case bounding polygons are determined including a bounding polygon for each graphical element. If the bounding polygons are disconnected, the bounding polygons are joined, for example by projecting one bounding polygon onto another bounding polygon. An overall bounding polygon is determined that encompasses the bounding polygons. The overall bounding polygon may be used to determine where to clip, or terminate, edges that are incident to the node. In some instances, at least one aspect of the graph drawing may be changed, and the graph may be redrawn. During redrawing, the overall bounding polygon may be determined again, and clipping of incident edges may be determined again. In some instances, a graphical element (e.g., a shadow box) may be excluded from the outer bounding polygon.

Determining a bounding polygon may be performed by distinguishing the image foreground pixels and the image background pixels of a graphical element; and identifying the outer border pixels of the graphical element. An outline of the graphical element may be determined by identifying selected outer border pixels and joining the selected outer border pixels by straight-line segments to form a bounding polygon. The outer bounding polygon may in some instances be simplified without noticeable impact on the resultant quality of the graph drawing.

In another aspect, a non-transitory computer-readable medium is provided for drawing a graph with multiple nodes connected by multiple edges, with instructions for displaying an image representing a node and processing the image to distinguish image foreground pixels and image background pixels. Instructions cause an edge to be displayed incident to the node, the edge extending over selected background pixels and stopping short of selected foreground pixels. Additional instructions may be provided to perform operations in similar fashion as previously described.

Description

Figure 4:
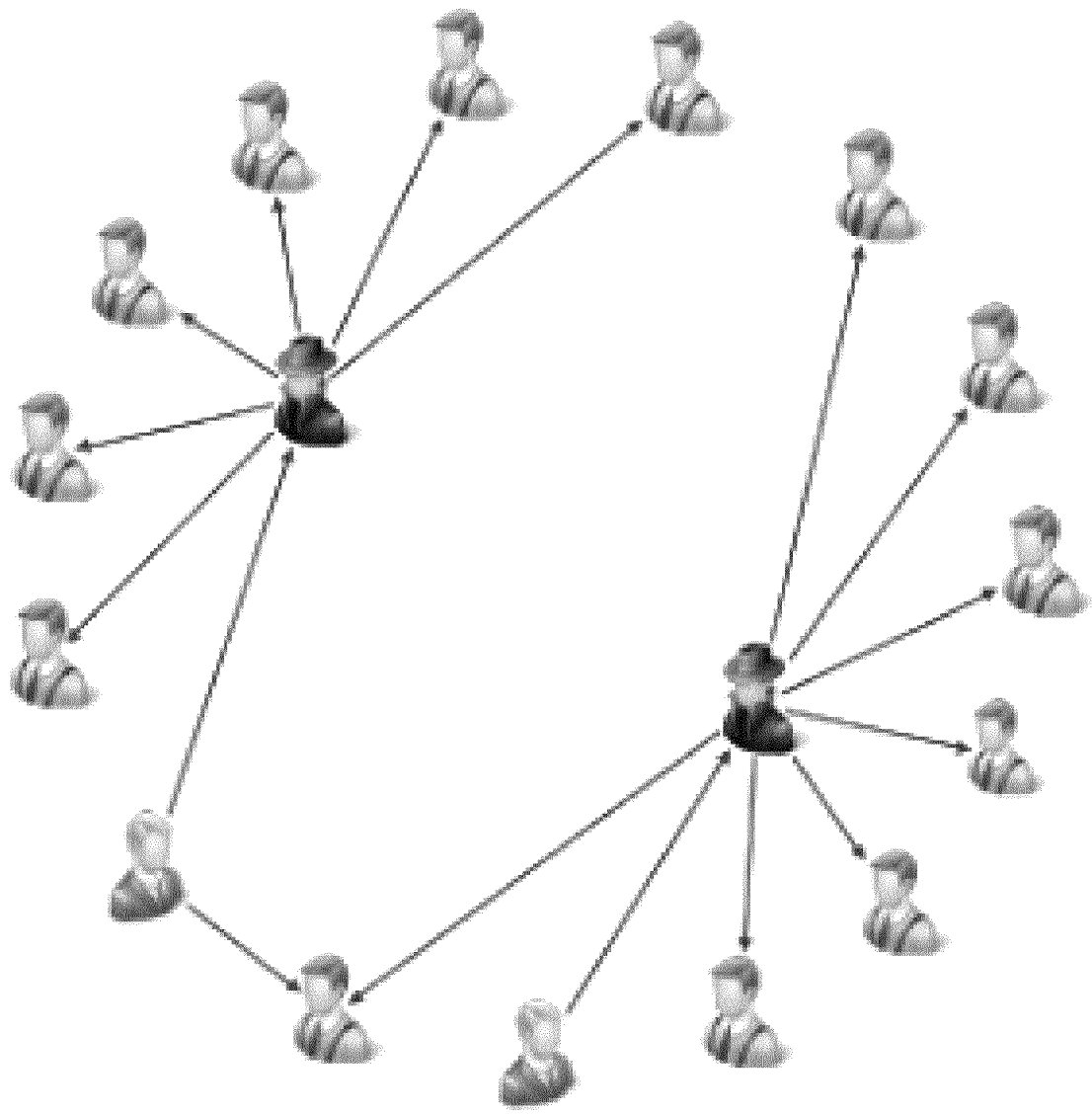
FIG. 4 is a diagram of a graph drawing with precise edge clipping, in which lines are clipped according to the precise shapes of the nodes.

The subject of this patent application is a technique for clipping connecting lines, or edges, at the precise shape of the visible portion of nodes. An example of a drawing using such an approach is shown in FIG. 4. Such precise clipping eliminates distraction and improves the appearance of the graph drawing.

Figure 5:
FIG. 5 is a diagram of a composite node representation consisting of an image and a textual label beneath it.
Figure 7:
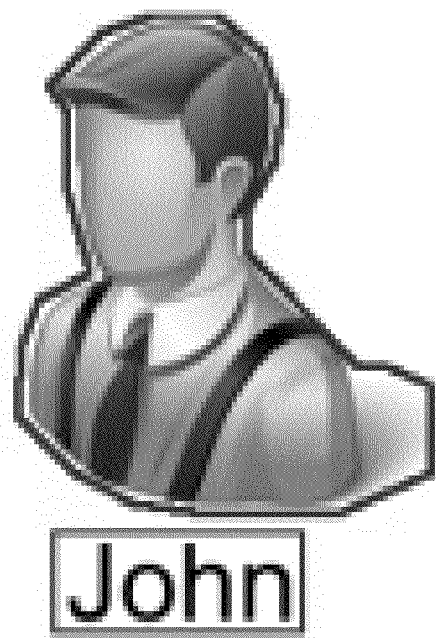
FIG. 7 is a diagram of the node of FIG. 5 showing bounding polygons.
Figure 8:
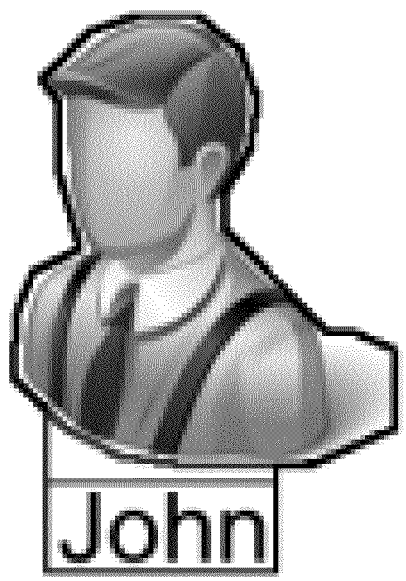
FIG. 8 is a diagram of the node of FIG. 7 illustrating joining of polygons, in which disconnected outline polygons are joined by projecting one onto another.

A composite representation of a node may consist of several graphical elements, e.g., a picture and a textual label as shown in FIG. 5. The precise shape of such a node may be derived as follows:

1. For each graphical element constituting the node, a polygon defining the outline of the element is calculated. For text elements, a rectangular bounding box is normally used as shown in FIG. 7.
2. Calculate the union of all polygons calculated in Step 1.
3. If the union is connected, it is returned as the shape of the node.
4. If the union consists of several disconnected polygons, as seen with FIG. 7, then pairs of such polygons are joined by projecting one onto the other, as seen with FIG. 8. In case of too many disconnected polygons, special care is taken to avoid quadratic processing time and one polygon is projected onto another only if they are next to each other on the final outline of the node.

Figure 6:
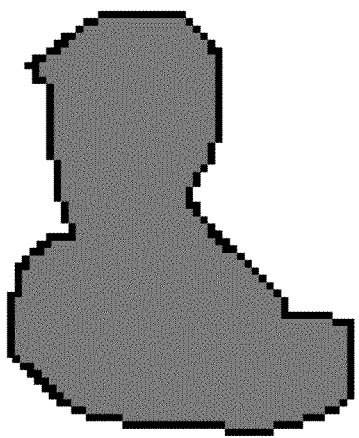
FIG. 6 is a diagram of the node of FIG. 5 showing a foreground region shown as gray, with the pixels on the outer border shown as a dark outline.

The outline polygons of text elements and polygonal shape elements may be calculated in a straightforward way. In one embodiment, the outlines of curved shapes are approximated with polygons. The outlines of image elements may be derived as follows:

1. The pixels of a given image are partitioned into foreground and background pixels.
2. An initial fine-grained outline, as shown for example in FIG. 6, is obtained by visiting the foreground pixels on the outer border in a clockwise manner.
3. To reduce the complexity of the outline polygon and to speed-up the subsequent calculations, some points may be removed from the outline if such a removal does not change its shape significantly.

Figure 9:
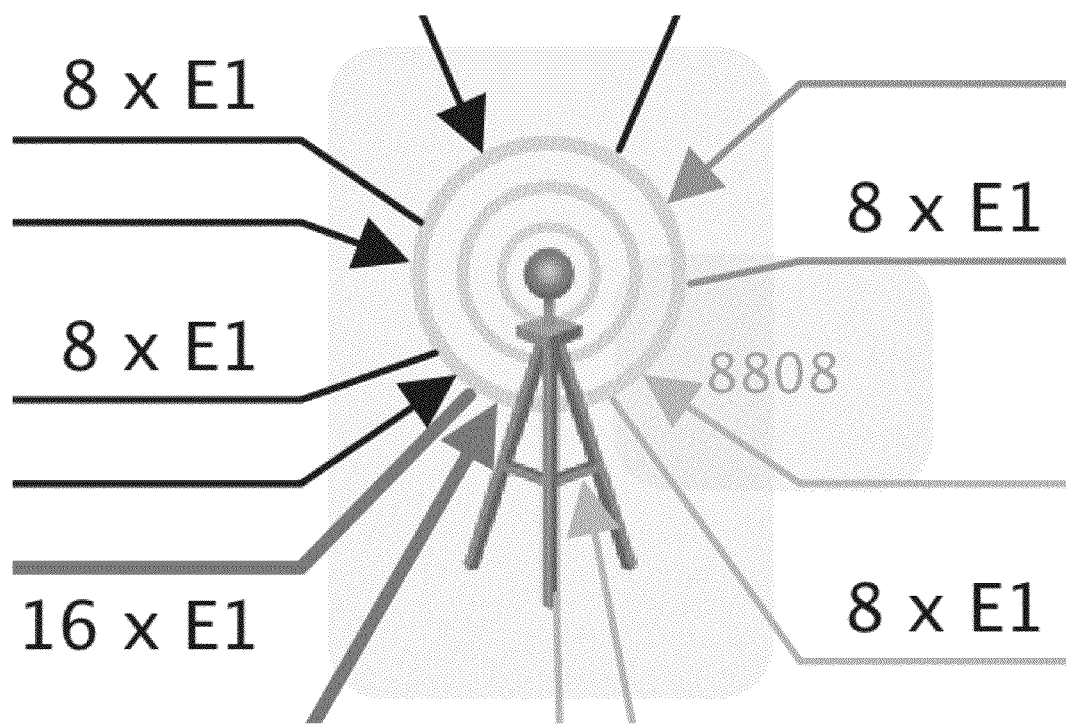
FIG. 9 is a diagram of a portion of a graph drawing surrounding a node having a feature that is ignored for purposes of edge clipping (a selection rectangle is excluded from the precise shape of the node).
Figure 10:
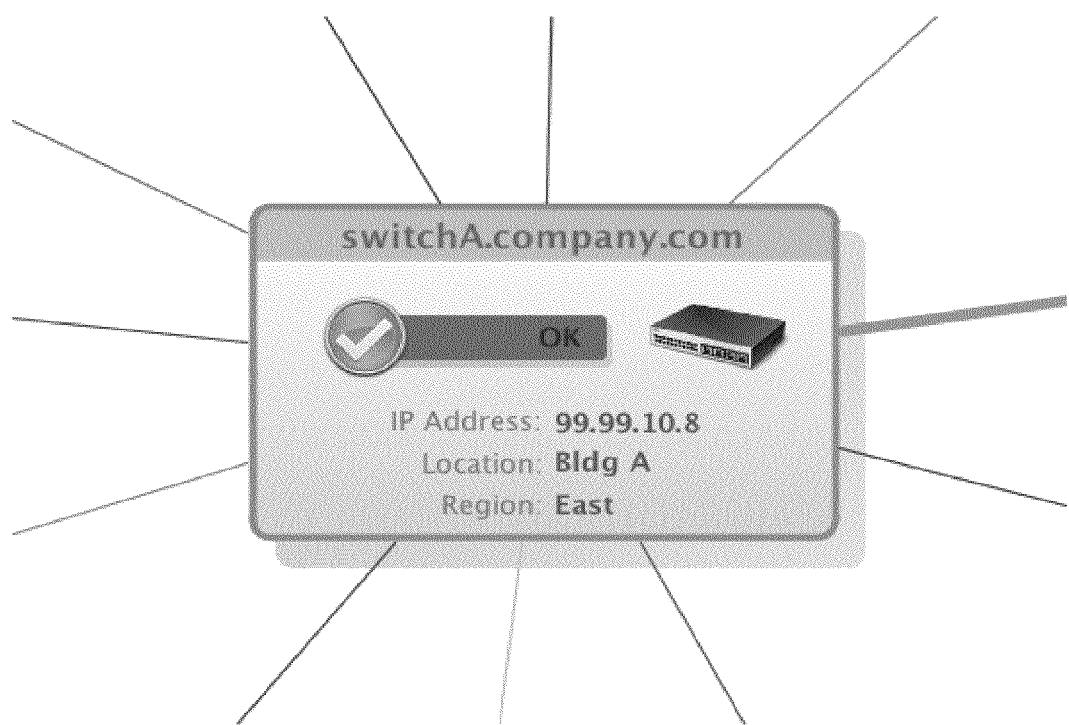
FIG. 10 is a diagram of a portion of another graph drawing surrounding a node having a feature that is ignored for purposes of edge clipping (a shadow element is excluded from the precise shape of the node).

It may be desirable to exclude some of the graphical elements from the precise shape of a node, e.g., when an element represents the selection state of the node or a shadow of the principal graphical elements, as shown in FIG. 9 and FIG. 10, respectively. Marking those graphical elements as secondary and ignoring them during the calculation of the precise shape is one way to achieve this.

Figure 11:
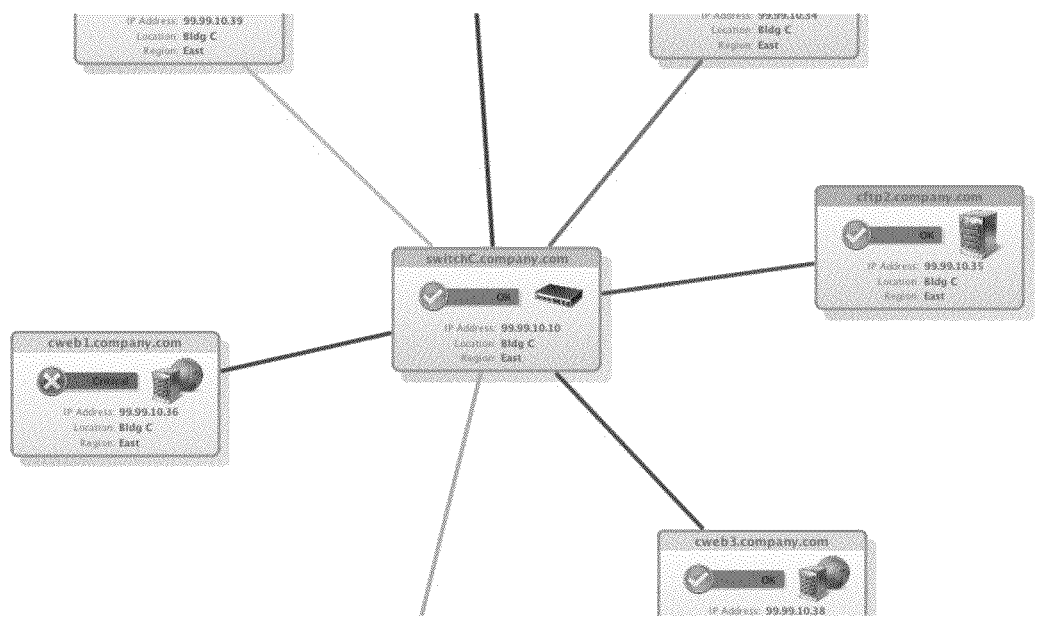
FIG. 11 is a first graph drawing of a graph in which more details are shown corresponding to a higher zoom level.
Figure 12:
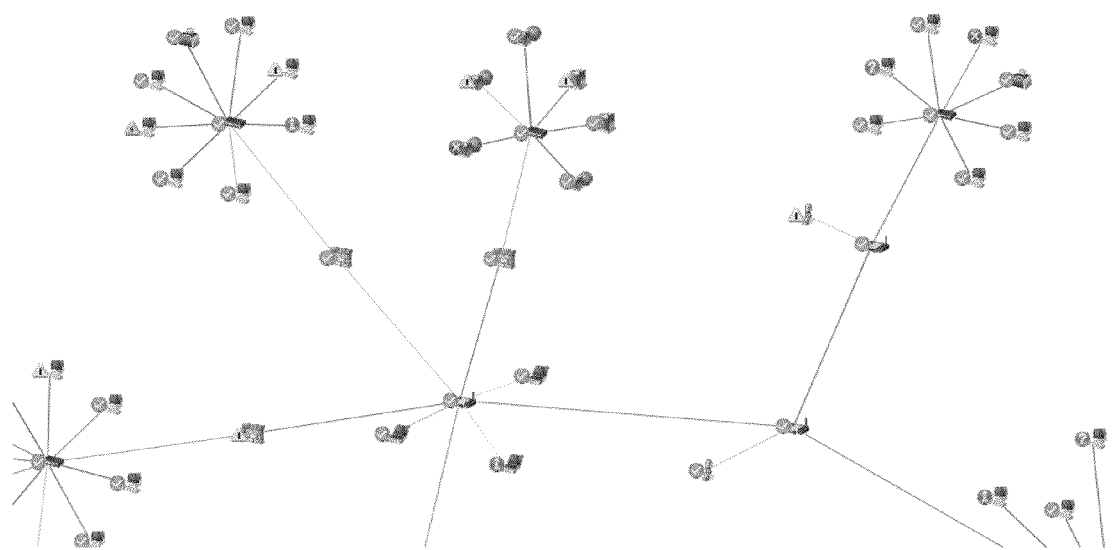
FIG. 12 is a second, different graph drawing of the graph of FIG. 11 in which fewer details are shown corresponding to a lower zoom level.

The representation of a node may change dynamically depending on the current zoom level and other factors. To maintain the correct precise shape of such a node, it should be recalculated every time the visual representation of the node changes, as shown in FIG. 11 and FIG. 12. In FIG. 11, a first graph drawing is shown of a graph in which more details are shown corresponding to a higher zoom level. In FIG. 12, a second, different graph drawing of the graph of FIG. 11 is shown in which fewer details are shown corresponding to a lower zoom level.

Figure 13:
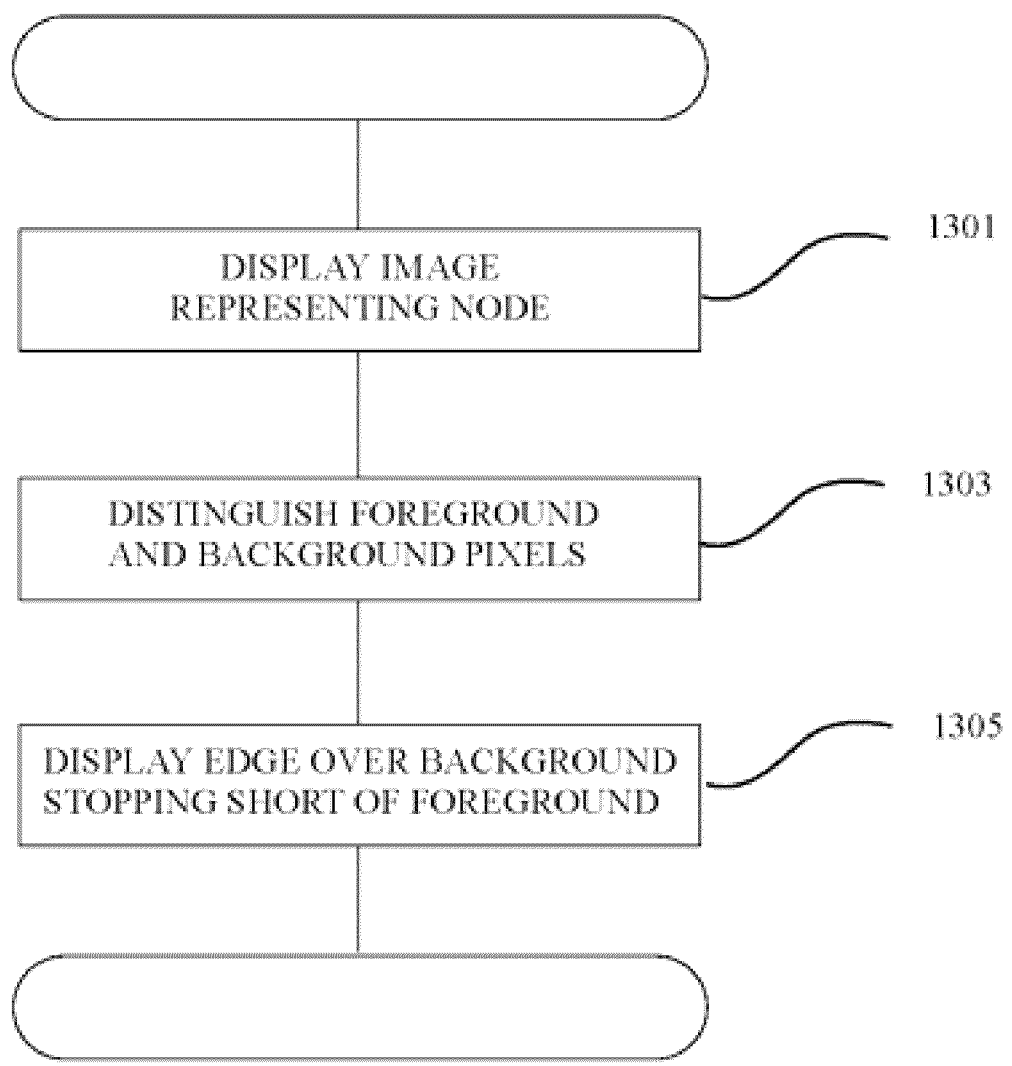
FIG. 13 is a flowchart illustrating an example flow of precise edge clipping.

Referring to FIG. 13, a flowchart is shown illustrating an example flow of a computer implemented method of drawing a graph with multiple nodes connected by multiple edges, using precise edge clipping. At 1301, an image is displayed representing a node. At 1303, the image is processed to distinguish image foreground pixels and image background pixels. At 1305, an edge is displayed incident to the node, with the edge extending over selected background pixels and stopping short of selected foreground pixels. The order in which these steps are performed may be varied.

Figure 1:
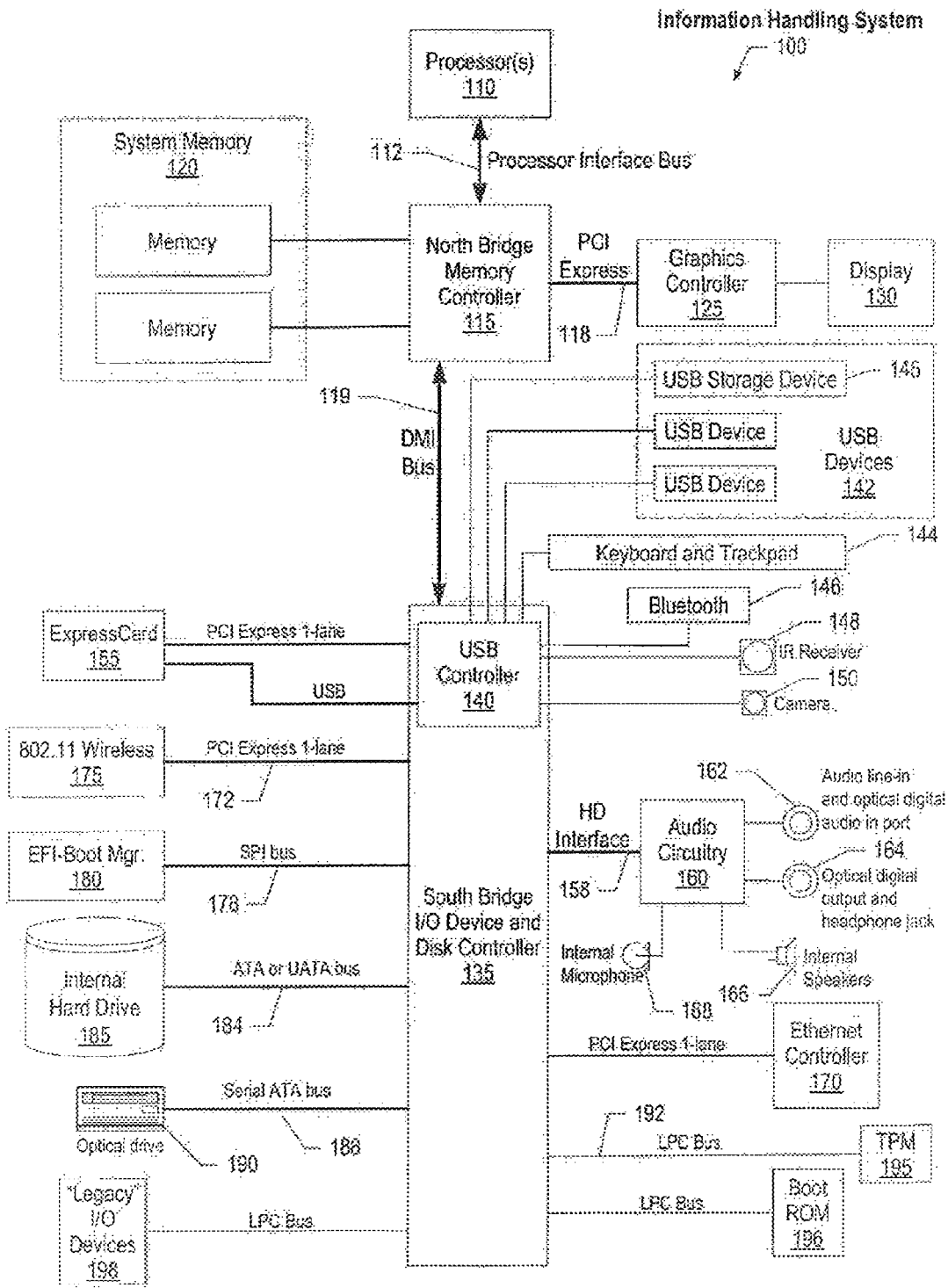
FIG. 1 is a block diagram of an information processing system.

FIG. 1 illustrates information-handling system 100, which is a modified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge, Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" Chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system; ExpressCard 155 supports both PCI Express and USB connectivity as it connects to Southbridge 135 using both the Universal Serial Bus (USB) and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172, LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, an ATM machine, a portable telephone device, a communication device, or other devices that include a processor and memory.

The Trusted Platform Module (TPM 195) shown in FIG. 1 and described herein to provide security functions is but one example of a hardware security module (HSM). Therefore, the TPM described and claimed herein includes any type of FISM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
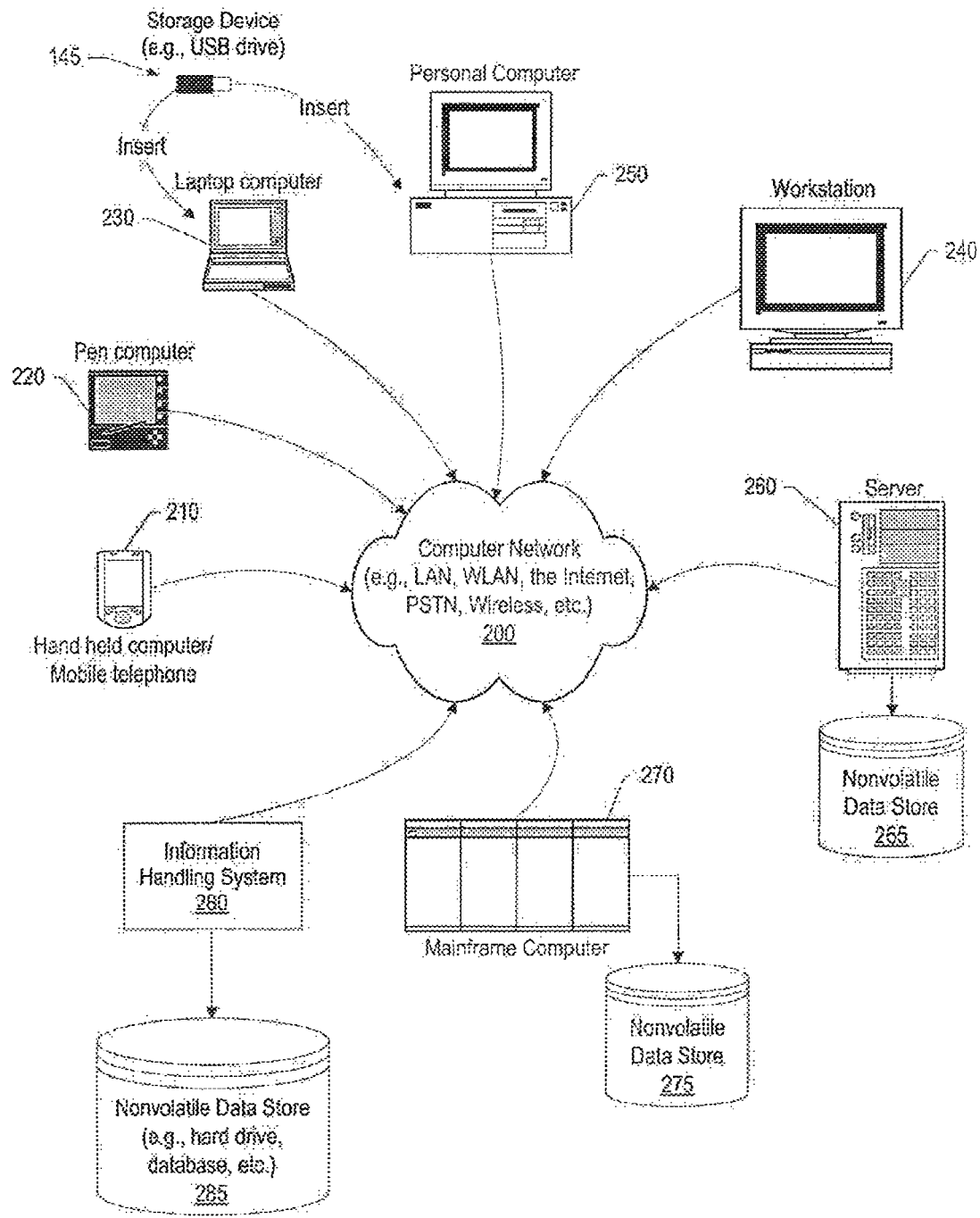
FIG. 2 is a block diagram of a networked information processing system.
Figure 3:
FIG. 3 is a diagram of a graph drawing without precise edge clipping, in which nodes are represented as images, and lines are clipped at the bounding rectangles of nodes.

FIG. 2 provides an extension example of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer networks that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depict separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

It will be appreciated by those skilled in the art that the present invention can be embodied in other specific forms without departing from the spirit or essential character thereof. The foregoing description is therefore intended in all respects to be illustrative and not restrictive. The scope of the invention is indicated by the appending claims, not the foregoing description, and all changes which come within the meaning and range of equivalents thereof are intended to be embraced therein.

What is claimed is:

1. A computer implemented method of drawing a graph comprising a plurality of nodes connected by a plurality of edges, using a computer system comprising a computer display and computer coupled to the computer display and comprising a processor and a memory, the method comprising:
    the processor displaying on the display an image representing a node;
    the processor processing the image to distinguish image foreground pixels and image background pixels; and
    the processor displaying on the display an edge incident to the node, the edge extending over selected background pixels and stopping short of selected foreground pixels.

2. The method of claim 1, wherein the image comprises a plurality of graphical elements, the method comprising:
    the processor determining bounding polygons comprising a bounding polygon for each graphical element;
    if the bounding polygons are disconnected, the processor joining the bounding polygons.

3. The method of claim 2, comprising the processor determining an overall bounding polygon that encompasses the bounding polygons.

4. The method of claim 3, comprising:
    the processor responding to a user changing at least one aspect of the graph by redrawing the graph; and
    the processor, during redrawing, determining again the overall bounding polygon.

5. The method of claim 2, wherein joining the bounding polygons comprises projecting at least one bounding polygon onto at least one other bounding polygon.

6. The method of claim 2, wherein determining a bounding polygon comprises:
    the processor distinguishing image foreground pixels and image background pixels of a graphical element; and
    the processor identifying outer border pixels of the graphical element.

7. The method of claim 6, comprising the processor determining an outline of the graphical element by:
    identifying selected outer border pixels; and
    joining the selected outer border pixels by straight line segments to form a bounding polygon.

8. The method of claim 5, comprising the processor simplifying the outer bounding polygon.

9. The method of claim 5, comprising the processor excluding at least one graphical element from the outer bounding polygon.

10. A non-transitory computer-readable medium for drawing a graph comprising a plurality of nodes connected by a plurality of edges, comprising instructions for:
    displaying an image representing a node;
    processing the image to distinguish image foreground pixels and image background pixels; and
    displaying an edge incident to the node, the edge extending over selected background pixels and stopping short of selected foreground pixels.

11. The non-transitory computer-readable medium of claim 10, wherein the image comprises a plurality of graphical elements, comprising instructions for:
    determining bounding polygons comprising a bounding polygon for each graphical element;
    if the bounding polygons are disconnected, joining the bounding polygons.

12. The non-transitory computer-readable medium of claim 11, comprising instructions for determining an overall bounding polygon that encompasses the bounding polygons.

13. The non-transitory computer-readable medium of claim 12, comprising instructions for:
    changing at least one aspect of the graph, and redrawing the graph; and
    during redrawing, determining again the overall bounding polygon.

14. The non-transitory computer-readable medium of claim 11, wherein instructions for joining the bounding polygons comprise instructions for projecting at least one bounding polygon onto at least one other bounding polygon.

15. The non-transitory computer-readable medium of claim 11, wherein instructions for determining a bounding polygon comprise instructions for:
    distinguishing image foreground pixels and image background pixels of a graphical element; and
    identifying outer border pixels of the graphical element.

16. The non-transitory computer-readable medium of claim 15, comprising instructions for determining an outline of the graphical element by:
   identifying selected outer border pixels; and
   joining the selected outer border pixels by straight line segments to form a bounding polygon.

17. The non-transitory computer-readable medium of claim 14, comprising instructions for simplifying the outer bounding polygon.

18. The non-transitory computer-readable medium of claim 14, comprising instructions for excluding at least one graphical element from the outer bounding polygon.

\* \* \* \* \*